(12) United States Patent
Shimizu et al.

(10) Patent No.: US 9,023,540 B2
(45) Date of Patent: May 5, 2015

(54) AIR BATTERY, METHOD OF USING AN AIR BATTERY, AND ELECTRONIC DEVICE

(71) Applicant: Sony Corporation, Tokyo (JP)

(72) Inventors: Keisuke Shimizu, Kanagawa (JP); Eishi Endo, Tokyo (JP)

(73) Assignee: Sony Corporation (JP)

( * ) Notice: Subject to any disclaimer, the term of this patent is extended or adjusted under 35 U.S.C. 154(b) by 39 days.

(21) Appl. No.: 13/850,745

(22) Filed: Mar. 26, 2013

(65) Prior Publication Data

US 2013/0260265 A1    Oct. 3, 2013

(30) Foreign Application Priority Data

Apr. 2, 2012    (JP) .................. 2012-083479

(51) Int. Cl.
*H01M 4/36* (2006.01)
*H01M 12/08* (2006.01)
*H01M 4/64* (2006.01)
*H01M 8/02* (2006.01)
*H01M 4/66* (2006.01)
*H01M 4/74* (2006.01)

(52) U.S. Cl.
CPC .............. *H01M 12/08* (2013.01); *Y02E 60/50* (2013.01); *H01M 4/64* (2013.01); *H01M 4/661* (2013.01); *H01M 4/74* (2013.01); *H01M 8/0202* (2013.01); *H01M 8/023* (2013.01); *H01M 8/0232* (2013.01); *H01M 2220/10* (2013.01); *H01M 2220/20* (2013.01); *H01M 2220/30* (2013.01); *H01M 2250/10* (2013.01); *H01M 2250/20* (2013.01); *H01M 2250/30* (2013.01); *Y02B 90/14* (2013.01); *Y02B 90/18* (2013.01); *Y02T 90/32* (2013.01)

(58) Field of Classification Search
None
See application file for complete search history.

(56) References Cited

U.S. PATENT DOCUMENTS

| | | | | |
|---|---|---|---|---|
| 5,993,999 A | * | 11/1999 | Rivers et al. ................... | 429/244 |
| 2010/0055571 A1 | * | 3/2010 | Le Guenne et al. ....... | 429/231.95 |
| 2011/0059355 A1 | * | 3/2011 | Zhang et al. .................. | 429/188 |
| 2011/0104571 A1 | * | 5/2011 | Zhamu et al. ............. | 429/231.95 |
| 2012/0171594 A1 | * | 7/2012 | Mizuno et al. ................ | 429/480 |
| 2013/0171502 A1 | * | 7/2013 | Chen et al. .................... | 429/149 |

FOREIGN PATENT DOCUMENTS

| | | |
|---|---|---|
| JP | 05-258782 A | 10/1993 |
| JP | 2009-252637 A | 10/2009 |

OTHER PUBLICATIONS

Lu et al., "The Influence of Catalysts on Discharge and Charge Voltages of Rechargeable Li-Oxygen Batteries", Electrochemical and Solid-State Letters, 13 (6) A69-A72, The Electrochemical Society, Apr. 1, 2010, 4 pages.

(Continued)

*Primary Examiner* — Patrick Ryan
*Assistant Examiner* — Jose Colucci Rios
(74) *Attorney, Agent, or Firm* — Sheridan Ross P.C.

(57) ABSTRACT

A battery device, including a negative electrode; an air electrode; an electrolyte layer that is positioned between the negative electrode and the air electrode; a first current collector on a first surface of the air electrode closest to the negative electrode; and a second current collector on a second surface of the air electrode positioned opposite to the negative electrode; where the first current collector and the second current collector are each electrically connected to the air electrode.

20 Claims, 12 Drawing Sheets

(56) References Cited

OTHER PUBLICATIONS

Debart et al., "An O2 cathode for rechargeable lithium batteries: The effect of a catalyst", Journal of Power Sources 174, 1177-1182, Elsevier B.V., 2007, 6 pages.

Thapa et al., "Pd/MnO2 Air Electrode Catalyst for Rechargeable Lithium/Air Battery", Electrochemical and Solid State Letters, 13 (11) A165-A167, The Electrochemical Society, Sep. 3, 2010, 3 pages.

* cited by examiner

AIR BATTERY, METHOD OF USING AN AIR BATTERY, AND ELECTRONIC DEVICE

BACKGROUND

In air batteries (also referred to as metal-air batteries), a metal having high energy density can be used as a negative electrode active material, and oxygen in the air is used as a positive electrode active material. Thus, air batteries may operate as a half battery, and the amount of electrode active material may be reduced or halved. Accordingly, air batteries may theoretically obtain an improved energy density. The electromotive force and capacity of air batteries differ greatly depending on the kind of metal that is used for the negative electrode. For example, research has been conducted into practical applications of air batteries in which lithium (i.e., a metal with the smallest atomic number) is used for a negative electrode because a large capacity may be obtained, as well as improved theoretical electromotive force as large as approximately 3 V.

An air battery may include an air electrode (positive electrode), a negative electrode, an electrolyte layer, and a housing provided with an opening through which oxygen is taken in from the outside, for example. In certain embodiments, the air electrode is formed from a carbon material and a catalyst, such as a metal, that is added to the carbon material, in a reaction field of oxygen. As described above, the negative electrode may be formed from a metal element such as lithium. An electrolytic solution that is used for the electrolyte layer is broadly classified into an organic electrolytic solution and an aqueous electrolytic solution. Various electrolytic solutions have advantages and disadvantages. However, an organic electrolytic solution has the advantage that the theoretical capacity is larger than that of an aqueous electrolytic solution. In addition, the electrolyte layer may be formed from a separator impregnated with the electrolytic solution to prevent a short between the air electrode and the negative electrode.

In air batteries in the prior art, a metallic mesh for current collection is provided on an oxygen intake surface of the air electrode, and during charging and discharging, a voltage, which is positive with respect to the negative electrode, is applied to the metallic mesh.

SUMMARY

However, air batteries are problematic in that, during discharging, when a voltage that is positive with respect to the negative electrode, is applied to the metallic mesh provided on the oxygen intake surface of the air electrode, an insulating discharge product (reaction product) (such as $Li_2O_2$, $Li_2O$, or other Li products) may be generated from a side that is close to an oxygen introducing portion in the air electrode of the battery. When a surface of the air electrode is covered with the discharge product, it clogs a void that otherwise allows a passage of oxygen in the air electrode. Thus, oxygen diffusion to the inside of the air electrode is suppressed from an initial discharging stage, and the discharging is inhibited and/or terminated. In other words, the discharge capacity of the air battery is reduced or eliminated. As the thickness of the air electrode increases, this problem also increases.

Therefore, it is desirable to provide an air battery that is capable of substantially maintaining oxygen diffusion to the inside of an air electrode for a long time and is capable of obtaining a high discharge capacity during discharging, and that is capable of preventing oxygen from being retained inside the air electrode during charging, and a method of using the air battery.

Furthermore, it is desirable to provide an air battery adapted for use with an electronic device. The above-described objects and other objects will be apparent from the description of the following specification with reference to the attached drawings. Inn various aspects of the present disclosure, there is provided a battery device including: a negative electrode; an air electrode; an electrolyte layer that is positioned between the negative electrode and the air electrode; a first current collector on a first surface of the air electrode closest to the negative electrode; and a second current collector on a second surface of the air electrode positioned opposite to the negative electrode; where the first current collector and the second current collector are each electrically connected to the air electrode.

In addition, according to other embodiments of the present disclosure, there is provided a method of using an air battery, when using the air battery including a negative electrode; an air electrode; an electrolyte layer that is positioned between the negative electrode and the air electrode; a first current collector on a first surface of the air electrode closest to the negative electrode; and a second current collector on a second surface of the air electrode positioned opposite to the negative electrode; where the first current collector and the second current collector are each electrically connected to the air electrode, the method including: applying a voltage, which is positive with respect to the negative electrode, to at least the first current collector in the first current collector and the second current collector during discharging; and applying a voltage, which is positive with respect to the negative electrode, to at least the second current collector in the first current collector and the second current collector during charging.

In addition, according to still other embodiments of the present disclosure, there is provided an air battery adapted for use with an electronic device including: an air battery, where the air battery includes a negative electrode; an air electrode; an electrolyte layer that is positioned between the negative electrode and the air electrode; a first current collector on a first surface of the air electrode closest to the negative electrode; and a second current collector on a second surface of the air electrode positioned opposite to the negative electrode; where the first current collector and the second current collector are each electrically connected to the air electrode.

In various aspects of the present disclosure, the second current collector may have an oxygen-permeable configuration. For example, the second current collector may have, for example, an opening through which oxygen can permeate. In certain embodiments, the first current collector and the second current collector may be constructed by a metallic mesh (a metal having a net structure). The negative electrode may be constructed by a metallic electrode, or an electrode that contains at least one kind of metal as a main component. The negative electrode may contain at least one kind of metal selected from a group consisting of lithium (Li), potassium (K), sodium (Na), magnesium (Mg), calcium (Ca), zinc (Zn), and aluminum (Al), but there is no limitation thereto.

According to still other embodiments of the present disclosure, there is provided an air battery adapted for use with a battery pack including: an air battery; a control unit that performs a control with respect to the air battery; and a housing in which the air battery is accommodated, where the air battery includes a negative electrode; an air electrode; an electrolyte layer that is positioned between the negative electrode and the air electrode; a first current collector on a first surface of the air electrode closest to the negative electrode;

and a second current collector on a second surface of the air electrode positioned opposite to the negative electrode; where the first current collector and the second current collector are each electrically connected to the air electrode.

In this battery pack, the control unit may perform, for example, control of charging, discharging, over-discharging, and over-charging with respect to the air battery.

In addition, according to still other embodiments of the present disclosure, there is provided an air battery adapted for use with an electronic device including: an air battery; a control unit that performs a control with respect to the air battery; and a housing in which the air battery is accommodated, where the air battery includes a negative electrode; an air electrode; an electrolyte layer that is positioned between the negative electrode and the air electrode; a first current collector on a first surface of the air electrode closest to the negative electrode; and a second current collector on a second surface of the air electrode positioned opposite to the negative electrode; where the first current collector and the second current collector are each electrically connected to the air electrode.

In various embodiments, the electronic device may be any electronic device and include both a portable type device and a stationary type device. Various examples of the electronic device include cellular phones, mobile devices, robots, personal computers, in-vehicle devices, and various household electric appliances, among others.

In addition, according to still other embodiments of the disclosure, there is provided an air battery adapted for use with an electrically driven vehicle including: a converter to which electric power is supplied from an air battery and which converts the electric power to a driving force of a vehicle; and a control device that performs an information processing with respect to a vehicle control on the basis of information related to the air battery, where the air battery includes a negative electrode; an air electrode; an electrolyte layer that is positioned between the negative electrode and the air electrode; a first current collector on a first surface of the air electrode closest to the negative electrode; and a second current collector on a second surface of the air electrode positioned opposite to the negative electrode; where the first current collector and the second current collector are each electrically connected to the air electrode.

In the electrically driven vehicle, the convertor may be is supplied with electric power from the air battery and rotates a motor to generate a driving force. This motor may use regenerative energy. In addition, the control device performs, for example, information processing related to a vehicle control on the basis of a remaining battery power of the air battery. This electrically driven vehicle includes, for example, a hybrid car in addition to an electric vehicle, an electrically driven bike, an electrically driven bicycle, and a railway vehicle, among others.

In addition, according to still another embodiment of the present disclosure, there is provided an air battery adapted for use with an electric power system that is constructed to be supplied with electric power from the air battery and/or to supply the electric power to the air battery from an electric power source, where the air battery includes a negative electrode; an air electrode; an electrolyte layer that is positioned between the negative electrode and the air electrode; a first current collector on a first surface of the air electrode closest to the negative electrode; and a second current collector on a second surface of the air electrode positioned opposite to the negative electrode; where the first current collector and the second current collector are each electrically connected to the air electrode.

The electric power system may be any power system as long as the power system uses electric power, and includes a simple electric power device. This electric power system includes, for example, a smart grid, a household energy management system (HEMS), and a vehicle, among others, and may store electricity.

In addition, according to still other embodiments of the present disclosure, there is provided an air battery adapted for use with an electric-power-storage power supply. The electric-power-supply-storage power supply may be constructed in such a manner that an electronic device to which electric power is supplied is connected thereto, the electric-power-storage power supply including: an air battery, where the air battery includes a negative electrode; an air electrode; an electrolyte layer that is positioned between the negative electrode and the air electrode; a first current collector on a first surface of the air electrode closest to the negative electrode; and a second current collector on a second surface of the air electrode positioned opposite to the negative electrode; where the first current collector and the second current collector are each electrically connected to the air electrode.

In certain embodiments, the electric-power-storage power supply may be used in any electric power system or any electric power device regardless of the use thereof, but for example, may also be used in the smart grid.

In the above-described air battery, from the viewpoint of reliably obtaining an effect of generating a discharge product from a portion of the air electrode on a negative electrode side during discharging, the air electrode may be constructed as follows. For example, the discharge over-voltage of a portion of the air electrode on a negative electrode side may be set to be lower than the discharge over-voltage of other portions. For example, the air electrode may be constructed to include a plurality of portions in which discharge over-voltages are different from each other in a direction from the negative electrode to the air electrode. For example, catalysts, which have discharge over-voltages different from each other, may be present in the plurality of portions of the air electrode, respectively.

The catalysts described herein may be said to be "positioned on" or "positioned in" and these terms include various arrangements of the catalysts; for example, the catalysts may be within a component, or on a component, or distributed throughout or around components of the battery in various manners.

In addition, for example, the air electrode may be constructed to include a first portion on the negative electrode side and a second portion on a side that is opposite to the negative electrode, a first catalyst having a first discharge over-voltage may be present at the first portion, and a second catalyst having a second discharge over-voltage higher than the first discharge over-voltage may be present at the second portion. In addition, in the air electrode, a first catalyst having a first discharge over-voltage may be present in a concentration distribution in which a concentration decreases in a direction from the negative electrode to the air electrode, and a second catalyst having a second discharge over-voltage higher than the first discharge over-voltage may be present in a concentration distribution in which a concentration increases in a direction from the negative electrode to the air electrode. The increases and decreases in concentrations and/or discharge over-voltage described herein may be substantially continuous or not.

In addition, the air electrode may be constructed to include a first portion on the negative electrode side and a second portion on a side that is opposite to the negative electrode, a catalyst may be present at the first portion, the catalyst may not be present at the second portion, and the discharge over-voltage of the second portion may be higher than the discharge over-voltage of the catalyst. Furthermore, for example, in the air electrode, a catalyst may be present in a concentration distribution in which a concentration decreases in a direction from the negative electrode to the air electrode.

According to the present disclosure, when a voltage, which is positive with respect to the negative electrode, is applied to the first current collector during discharging, it is advantageously possible to allow a discharge product to be generated from a portion of the air electrode on a negative electrode side. Accordingly, it is advantageously possible to effectively prevent a surface of the air electrode from being covered with the discharge product, and prevent a void from being clogged by the discharge product, where the void is a passage allowing for the flow of oxygen in the air electrode. As a result, diffusion of oxygen to the inside of the air electrode may be substantially maintained for a long time, and the discharging may last to a final discharging stage. In addition, when a voltage, which is positive with respect to the negative electrode, is applied to the second current collector during charging, the discharge product may be advantageously decomposed from a portion of the air electrode on a side that is opposite to the negative electrode. Oxygen, which is generated by the decomposition of the discharge product, may be smoothly emitted to the outside from an oxygen intake surface of the air electrode after passing through the inside of the air electrode, and thus the oxygen may be effectively prevented from being retained inside the air electrode.

According to various embodiments of the present disclosure, it may be advantageously possible to obtain an air battery that is capable of substantially maintaining oxygen diffusion to the inside an air electrode for a long time and is capable of obtaining a high discharge capacity during discharging, and that is capable of preventing oxygen from being retained inside the air electrode during charging. In addition, it is possible to realize a battery pack, an electronic device, an electrically driven vehicle, an electric power system, and an electric-power-storage power supply, among others with improved performance by using the air battery.

DETAILED DESCRIPTION

The present disclosure contains subject matter related to that disclosed in Japanese Priority Patent Application JP 2012-083480 filed in the Japan Patent Office on Apr. 2, 2012, the entire contents of which are hereby incorporated by reference.

Hereinafter, certain embodiments of the present disclosure (hereinafter, referred to as "embodiments") are described. Although reference is made to various numbers of certain embodiments, the references to the numbers of embodiments are non-limiting. Thus, the present disclosure contains detailed description of exemplary embodiments to provide an understanding of the present disclosure. The description is made as follows:

1. First Embodiment (Air Battery, Manufacturing Method thereof, and Using Method thereof)

2. Second Embodiment (Air Battery, Manufacturing Method thereof, and Using Method thereof)

3. Third Embodiment (Air Battery, Manufacturing Method thereof, and Using Method thereof)

4. Fourth Embodiment (Air Battery, Manufacturing Method thereof, and Using Method thereof)

5. Fifth Embodiment (Air Battery, Manufacturing Method thereof, and Using Method thereof)

6. Sixth Embodiment (Air Battery, Manufacturing Method thereof, and Using Method thereof)

7. Seventh Embodiment (Air Battery, Manufacturing Method thereof, and Using Method thereof)

8. Eighth Embodiment (Air Battery, Manufacturing Method thereof, and Using Method thereof)

1. First Embodiment

Air Battery

Figure 1:
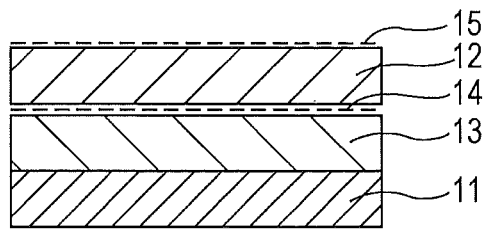
FIG. 1 is a diagram illustrating an air battery according to certain embodiments.

FIG. 1 shows an air battery according to the first embodiment. As shown in FIG. 1, the air battery include a negative electrode 11, an air electrode 12, an electrolyte layer 13 that is provided between the negative electrode 11 and the air electrode 12. The air battery further includes a first current collector 14 that is provided on a surface of the air electrode 12 on a negative electrode 11 side to be electrically connected to the air electrode 12, and a second current collector 15 that is provided on a surface of the air electrode 12 on a side that is opposite to the negative electrode 11 to be electrically connected to the air electrode 12.

The negative electrode 11 is constructed by a material that contains at least one kind of metal, and may be a material that contains at least one kind of metal as a main component. Examples of this material include elemental metal including one kind selected from Li, K, Na, Mg, Ca, Zn, and Al, among others; an alloy formed from two or more kinds of metals; an alloy of one of these metals and another metal (for example, an alloy of Li and Si (silicon), or an alloy of Li and Sn (tin), among others), without limitation. In addition to this material, the negative electrode 11 may contain another conductive material, binding material, or other conductive or binding materials. Although the content of the conductive material or the binding agent that are contained in the negative electrode 11 is not limited, the content may be as small as possible to the extent that conductivity of the negative electrode 11 may be sufficiently obtained and a shape thereof may be stably maintained. This conductive material may be either an organic material or an inorganic material. Examples of the organic material include conductive polymers, and other organic material. Examples of the inorganic material include carbon-based materials (for example, various carbon particles), and other inorganic material. Binding materials may be used in batteries, such as polyvinylidene fluoride (PVDF), styrene butadiene rubber (SBR), and polytetrafluoroethylene (PTFE), among others. Metallic foil may be directly used for the negative electrode 11.

The air electrode 12 is formed from a conductive material, a catalyst material, and a binding material, among others. Although the conductive material is not limited to the extent that this conductive material has conductivity and may be resistant to usage conditions of the air battery, for example, a carbon material such as carbon black, activated carbon, and carbon fibers is used. Since a discharge product is generated on a surface of the conductive material during discharging of the air battery, the conductive material may have a large specific surface area. In addition, the content of the conductive material in the air electrode 12 may be as large as possible from the viewpoint of a battery capacity. As the catalyst material, an inorganic ceramics such as manganese dioxide ($MnO_2$), a metal such as gold (Au), platinum (Pt), and palladium (Pd), an organic metal complex such as cobalt phthalocyanine, among others, may be used, but since the above-described carbon material itself has a catalytic activation, the catalyst material may not be necessary. A catalyst amount is not limited, and the catalyst amount may be as small as possible to the extent that a sufficient catalyst function may be exhibited with this amount. As the binding material, a binding material such as PVDF, SBR, and PTFE that are used in a general battery may be used. The content of the binding material is not limited, and the content may be as small as possible to the extent that a shape of the electrode may be stably maintained.

For example, the electrolyte layer 13 includes an electrolytic solution that carries out conduction of metal ions between the negative electrode 11 and the air electrode 12, and a separator that is filled with the electrolytic solution. The electrolytic solution is not limited and may be selected considering that the electrolytic solutions have metal ion conductivity, and an electrolytic solution in which a metal salt is dissolved in an organic solvent may be used. For example, in an air battery in which Li is used for the negative electrode 11 as the lithium salt, $LiPF_6$, $LiClO_4$, $LiBF_4$, $LiCF_3SO_3$, $LiN(CF_3SO_2)_2$, $LiN(C_2F_5SO_2)_2$, and $LiC(CF_3SO_2)_3$, among others, may be used. Various examples of the organic solvent that may be used include propylene carbonate, ethylene carbonate, dimethyl carbonate, diethyl carbonate, γ-butyrolactone, 1,2-dimethoxyethane, diethylene glycol dimethyl ether, triethylene glycol dimethyl ether, tetraethylene glycol dimethyl ether, tetrahydrofuran, acetonitrile, dimethyl sulfoxide, siloxane, an ion liquid, and a compound thereof, among others. Although not limited, a concentration of a salt in the electrolytic solution may be approximately 0.1 to 2 mol/L. As the separator that is used for the electrolyte layer 13, for example, a porous membrane of polyethylene or polypropylene, among others, a non-woven fabric such as a glass fiber, or others, may used.

The electrolyte layer 13 may be a polymer electrolyte in which an electrolyte is added to polyethylene oxide, or a gel electrolyte in which an electrolytic solution is supported by PVDF, among others. In addition, in a case where a negative electrode active material is lithium, for example, the electrolyte layer 13 may be a solid electrolyte such as lithium ion conductive glass ceramic. In addition, the electrolyte layer 13 may contain a liquid, a polymer, and a solid electrolyte, respectively, or these may be formed in a layer state. For example, the electrolyte layer 13 may have a three-layer structure of a polymer electrolyte/a solid electrolyte/a liquid-based electrolyte from the negative electrode 11 side.

The first current collector 14 and the second current collector 15 allow electrons to enter the air electrode 12 and exit therefrom during charging and discharging of the air battery. The second current collector 15 is constructed to have permeability with respect to oxygen in order for oxygen to be supplied to the air electrode 12 through the second current collector 15. The first current collector 14 is constructed in order for metal ions to enter and exit through the first current collector 14. In various embodiments, the first current collector 14 and the second current collector 15 are constructed by a metallic mesh. Although a material of the metallic mesh is not limited to the extent that the material may be resistant to a use circumstance of the air battery, a metallic mesh formed from Ni (nickel) or stainless steal (SUS) may be used. The hole diameter and other diameters of the metallic mesh are not limited. In various embodiments, the first current collector 14 and the second current collector 15 are constructed in an electrically independent manner, but there is no limitation thereto.

Structural Example of Air Battery

Figure 2:
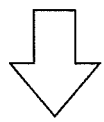
FIG. 2 is a diagram illustrating a structural example of the air battery according to certain embodiments.
Figure 2:
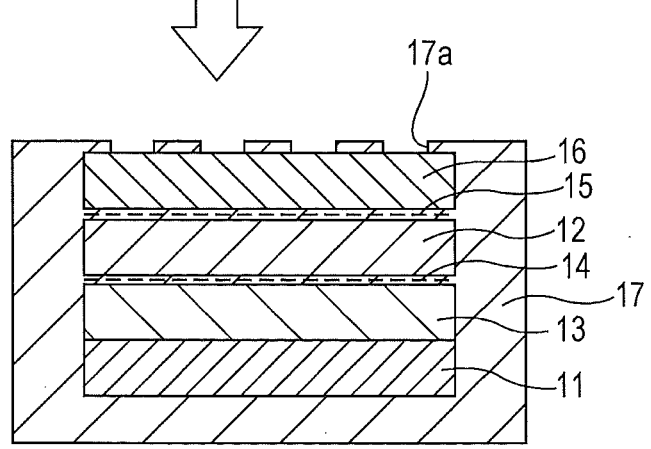

FIG. 2 shows a structural example of the air battery. As shown in FIG. 2, in the air battery, an oxygen-permeable membrane 16 is provided on the second current collector 15 formed on the air electrode 12. A material of the oxygen-permeable membrane 16 is not limited. In addition, all of the negative electrode 11, the electrolyte layer 13, the first current collector 14, the air electrode 12, the second current collector 15, and the oxygen-permeable membrane 16 are accommodated inside a housing 17. Openings 17a are formed in an upper portion of the housing 17, which comes into contact with the oxygen-permeable membrane 16, and the air (e.g., an oxygen-containing gas) reaches the oxygen-permeable membrane 16 from the outside through the openings 17a. In addition, after reaching the oxygen-permeable membrane 16, the air permeates through the oxygen-permeable membrane 16, and is supplied to the air electrode 12. The size, shape, and the number, disposition, and other properties of the openings 17a may vary.

Figure 3:
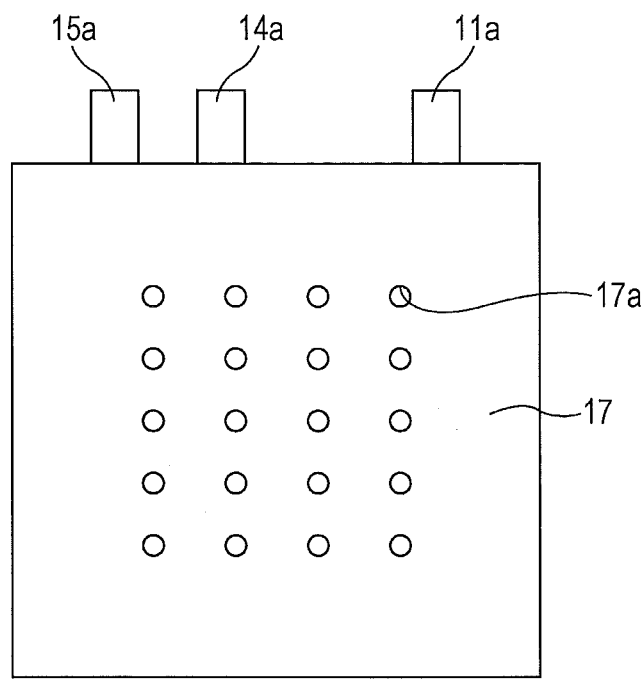
FIG. 3 is a view illustrating the air battery shown in FIG. 2.

FIG. 3 is an example of the view of the air battery shown in FIG. 2. As shown in FIG. 3, in this example, the air battery has a rectangular or square planar shape, and overall, the air battery has a quadrangular prism shape. The openings 17a are formed in the upper portion of the housing 17, which comes into contact with the oxygen-permeable membrane 16, in a two-dimensional matrix form. A lead portion 14a leads out from the first current collector 14 to the outside of the battery. For example, a lead portion 15a leads out from the second current collector 15 to the outside of the battery. Although not shown in FIG. 2, a current collector is provided on a lower surface of the negative electrode 11 to be electrically connected to this negative electrode 11, and as shown in FIG. 3, a lead portion 11a of this current collector also leads out to the outside of the battery from. In this example, the lead portions 11a, 14a, and 15a lead out from only one side surface of the air battery, but there is no limitation thereto.

Figure 4:
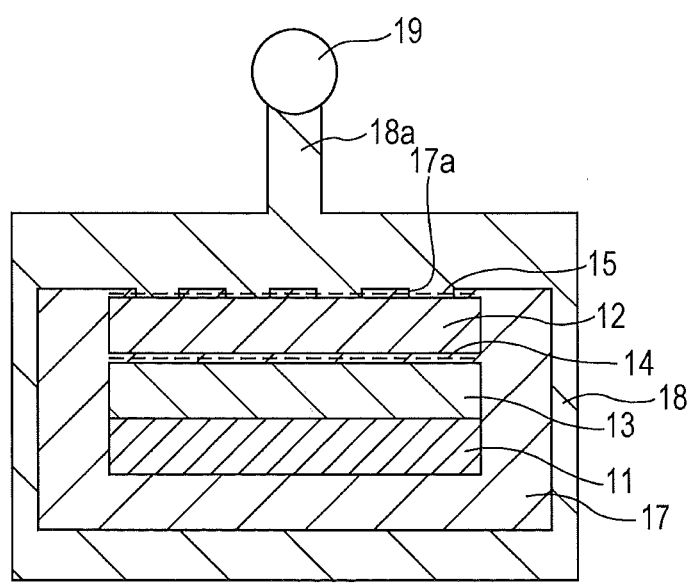
FIG. 4 is a diagram illustrating structural example of the air battery according to certain embodiments.

FIG. 4 shows another structural example of the air battery. As shown in FIG. 4, in this air battery, the oxygen-permeable membrane 16 is not provided differently from the air battery shown in FIG. 3. In addition, all of the negative electrode 11, the electrolyte layer 13, the first current collector 14, the air electrode 12, and the second current collector 15 are accommodated inside the housing 17. This housing 17 is accommodated inside a relatively large housing 18. This housing 18 has airtightness except for one end 18a, and the one end 18a is connected to a gas acquisition port of an oxygen bomb 19. In addition, oxygen may be supplied to the inside of the housing 18 in accordance with opening and closing of the oxygen bomb 19. The openings 17a are formed in an upper portion of the housing 17, which comes into contact with the air electrode 12, and oxygen, which is supplied to the inside of the housing 18, is supplied to the air electrode 12 through the openings 17a.

Method of Manufacturing an Air Battery

A method of manufacturing the air battery will be described.

The negative electrode 11 may be formed according to the material that is used.

Figure 5:
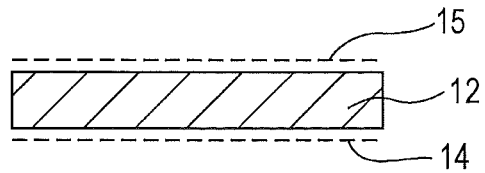
FIG. 5 is a diagram illustrating an air electrode that is used in the air battery according to certain embodiments.

As shown in FIG. 5, the first current collector 14 and the second current collector 15 are formed on both surfaces (an upper surface and a lower surface) of the air electrode 12, respectively. For example, the air electrode 12 including the first current collector 14 and the second current collector 15 may be manufactured as described below. For example, electrode materials, which are used to manufacture the air electrode 12, are mixed in a predetermined ratio using an organic solvent such as N,N-dimethyl formamide, N-methylpyrrolidone, acetone, and isopropyl alcohol, the solvent is sufficiently evaporated, the resultant electrode material mixture is interposed between two sheet of metallic meshes and is pressed, whereby a compressed shape of metallic mesh/air electrode/metallic mesh is obtained. Alternately, the electrode material mixture containing the solvent is applied to the metallic mesh by a blade coating method or other methods, the electrode material is dried, and the metallic mesh is compressed to another metallic mesh.

The negative electrode 11 and the air electrode 12 are made to face each other through the electrolyte layer 13. In this manner, as shown in FIG. 1, a target air battery is manufactured.

In a case of using the oxygen-permeable membrane 16 similarly to the air battery shown in FIG. 2, the oxygen-permeable membrane 16 is provided on the air electrode 12 through the second current collector 15. In addition, as shown in FIG. 2, all of the negative electrode 11, the electrolyte layer 13, the first current collector 14, the air electrode 12, the second current collector 15, and the oxygen-permeable membrane 16 are accommodated inside the housing 17.

In addition, in the air battery as shown in FIG. 4, the housing 17 is accommodated inside the housing 18, and one end 18a of the housing 18 is connected to a gas acquisition port of the oxygen bomb 19.

Method of Using an Air Battery

In the air battery, during discharging, a voltage, which is positive with respect to the negative electrode 11, is applied to the first current collector 14 that is connected to a surface of the air electrode 12 on a negative electrode 11 side, or both the first current collector 14 and the second current collector 15.

At this time, metal ions (for example, lithium ions ($Li^+$)) migrate from the negative electrode 11 to the air electrode 12 through the electrolyte layer 13, whereby electric energy is generated. On the other hand, during charging, a voltage, which is positive with respect to the negative electrode 11, is applied to the second current collector 15 that is connected to a surface of the air electrode 12 on a side that is opposite to the negative electrode 11, or both the second current collector 15 and the first current collector 14. At this time, the metal ions migrate from the air electrode 12 to the negative electrode 11 through the electrolyte layer 13, whereby the electric energy is converted into chemical energy and is stored.

Figure 6:
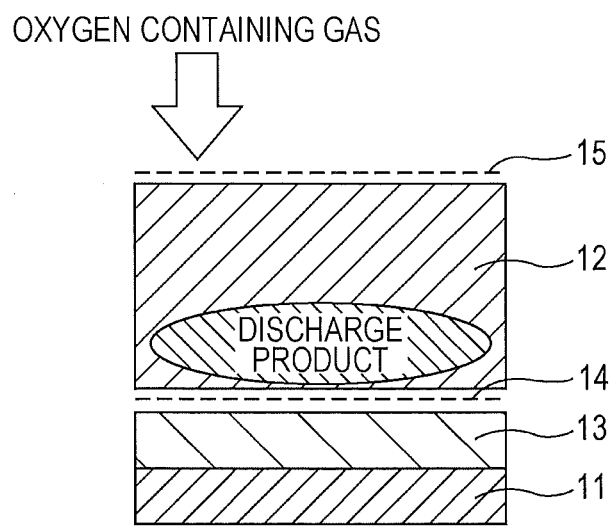
FIG. 6 is a diagram illustrating an operation of the air battery according to certain embodiments.

During discharging of this air battery, as shown in FIG. 6, when the voltage, which is positive with respect to the negative electrode 11, is applied to the first current collector 14, the metal ions from the negative electrode 11 react with oxygen, which permeates through the second current collector 15 and is supplied to the air electrode 12, from a portion of the air electrode 12 on a negative electrode 11 side, and a discharge product is generated. Then, the discharge product is generated toward the second current collector 15. For example, in a case where the negative electrode 11 is formed from lithium, $Li_2O_2$, $Li_2O$, and other Li products may be generated as the discharge product.

In addition, during charging of the air battery, as shown in FIG. 6, when a voltage, which is positive with respect to the negative electrode 11, is applied to the second current collector 15, the discharge product, which is generated inside the air electrode 12, is decomposed from a portion of the air electrode 12 on a second current collector 15 side. Therefore, the oxygen, which is generated due to the decomposition, may be smoothly emitted to the outside from a surface of the air electrode 12 on a second current collector 15 side after passing through the inside of the air electrode 12, and thus retention of oxygen inside the air electrode 12 during the charging may be effectively suppressed.

In certain embodiments disclosed herein, the air battery may be adapted for various uses. For example, there is provided a method of using an air battery, where the first current collector and the second current collector are each electrically connected to the air electrode, the method including: applying a voltage, which is positive with respect to the negative electrode, to at least the first current collector in the first current collector and the second current collector during discharging; and applying a voltage, which is positive with respect to the negative electrode, to at least the second current collector in the first current collector and the second current collector during charging.

In addition, according to still other embodiments of the present disclosure, there is provided an air battery adapted for use with an electronic device. In various aspects of the present disclosure, the second current collector may have an oxygen-permeable configuration. For example, the second current collector may have, for example, an opening through which oxygen can permeate. In certain embodiments, the first current collector and the second current collector may be constructed by a metallic mesh (a metal having a net structure). The negative electrode may be constructed by a metallic electrode, or an electrode that contains at least one kind of metal as a main component. The negative electrode may contain at least one kind of metal selected from a group consisting of lithium (Li), potassium (K), sodium (Na), magnesium (Mg), calcium (Ca), zinc (Zn), and aluminum (Al), but there is no limitation thereto.

According to still other embodiments of the present disclosure, there is provided an air battery adapted for use with a battery pack.

In this battery pack, the control unit may perform, for example, control of charging, discharging, over-discharging, and over-charging with respect to the air battery.

In addition, according to still other embodiments of the present disclosure, there is provided an air battery adapted for use with an electronic device including: an air battery; a control unit that performs a control with respect to the air battery; and a housing in which the air battery is accommodated.

In various embodiments, the electronic device may be any electronic device and include both a portable type device and a stationary type device. Various examples of the electronic device include cellular phones, mobile devices, robots, personal computers, in-vehicle devices, and various household electric appliances, among others.

In addition, according to still other embodiments of the disclosure, there is provided an air battery adapted for use with an electrically driven vehicle including: a converter to which electric power is supplied from an air battery and which converts the electric power to a driving force of a vehicle; and a control device that performs an information processing with respect to a vehicle control on the basis of information related to the air battery. In the electrically driven vehicle, the convertor may be is supplied with electric power from the air battery and rotates a motor to generate a driving force. This motor may use regenerative energy. In addition, the control device performs, for example, information processing related to a vehicle control on the basis of a remaining battery power of the air battery. This electrically driven vehicle includes, for example, a hybrid car in addition to an electric vehicle, an electrically driven bike, an electrically driven bicycle, and a railway vehicle, among others.

In addition, according to still another embodiment of the present disclosure, there is provided an air battery adapted for use with an electric power system that is constructed to be supplied with electric power from the air battery and/or to supply the electric power to the air battery from an electric power source. The electric power system may be any power system as long as the power system uses electric power, and includes a simple electric power device. This electric power system includes, for example, a smart grid, a household energy management system (HEMS), and a vehicle, among others, and may store electricity.

In addition, according to still other embodiments of the present disclosure, there is provided an air battery adapted for use with an electric-power-storage power supply. The electric-power-supply-storage power supply may be constructed in such a manner that an electronic device to which electric power is supplied is connected thereto, the electric-power-storage power supply including: an air battery.

EXAMPLE

The air battery was manufactured as described below.

The air electrode was manufactured as described below. Carbon black, manganese dioxide, and PVDF were weighed in a weight ratio of 73:14:13, and these were added to N-methyl pyrrolidone solvent, and were mixed and agitated. Then, the solvent was evaporated to prepare a powder composition. This powder composition was interposed between two sheets of Ni meshes (Ni-metal wire mesh, manufactured by Nilaco Corporation) that were processed in such a manner that lead portions could be led out from the air electrode in directions different from each other, and pressing was performed to manufacture the air electrode. The air electrode that was manufactured in this manner, has a thickness of approximately 200 μm, and the air electrode (excluding the lead portion) was processed to have a shape of approximately 3 cm×3 cm.

The negative electrode was manufactured as described below. For example, a Li metal (3 cm×3 cm) was compressed on a Ni mesh that was processed into a shape in which a lead portion could be led out from a negative electrode portion, to mold the negative electrode.

As the electrolytic solution, an electrolytic solution obtained by dissolving $LiN(CF_3SO_2)_2$ in 1-2-dimethoxyethane in a concentration of 1 mol/L was used. In addition, as the separator, a glass fiber separator was used. In addition, as the housing, an aluminum laminated film was used.

Figure 7:
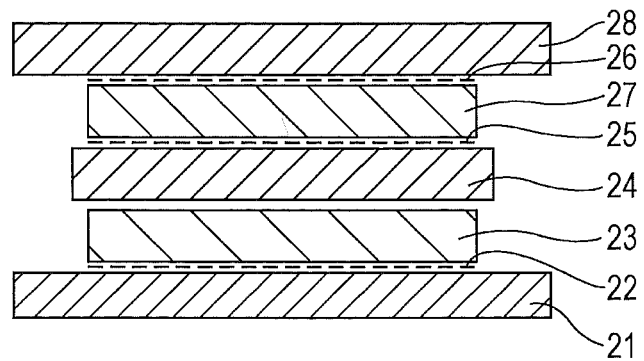
FIG. 7 is a diagram illustrating an air battery according to certain embodiments.
Figure 8:
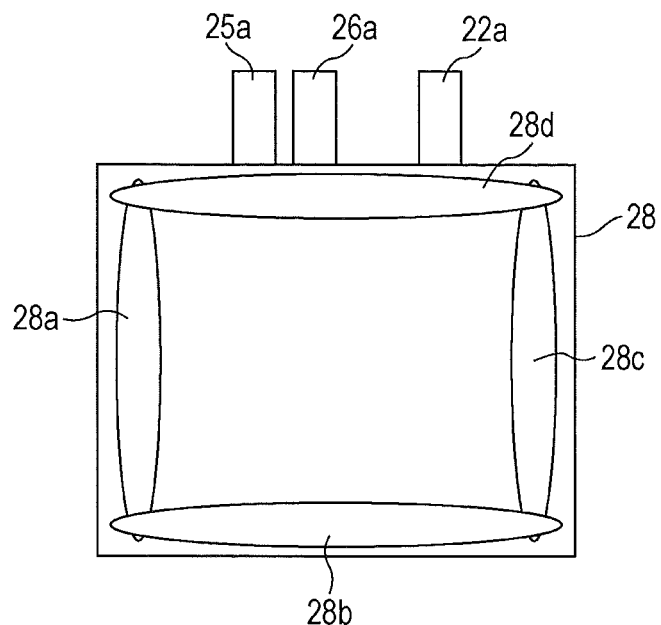
FIG. 8 is a view illustrating an air battery according to certain embodiments.

As shown in FIG. 7, a Li metal negative electrode 23 was disposed on an aluminum laminated film 21 to which a Ni mesh 22 is connected on a lower surface side thereof. An electrolytic solution was added dropwise on the Li metal negative electrode 23, and a glass fiber separator 24 that was processed to cover the entirety of the Li metal negative electrode 23, was disposed on the Li metal negative electrode 23. The electrolytic solution was added dropwise from the upper side of the glass fiber separator 24, and an air electrode 27, to which Ni meshes 25 and 26 are connected on an upper surface and a lower surface, respectively, was disposed on the glass fiber separator 24. Furthermore, the air electrode 27 was covered with an aluminum laminated film 28, and lead portions of the Ni meshes 22, 25, and 26 were led out to the outside of the aluminum laminated films 21 and 28. A view of this state is shown in FIG. 8. As shown in FIG. 8, in this state, heat pressing was performed along three sides of the aluminum laminated films 21 and 28 excepting a side from which the lead portions 22a, 25a, and 26a of the Ni meshes 22, 25, and 26 were led out to weld the laminated films 21 and 28, and heat pressing was performed with respect to the remaining one side under vacuum, whereby the air battery was manufactured. In FIG. 8, positions at which the heat pressing was performed were indicated by reference numerals 28a to 28d. Then, the aluminum laminated film 28 of the air battery that was manufactured in this manner, on an air electrode 27 side was processed using a cutter knife or other cutting device to form an oxygen introducing opening.

Charging and discharging of the air battery that was manufactured in this manner, were performed under a pure oxygen (pressure: 1 atm) atmosphere, it was confirmed that when the discharging was performed using the Ni mesh 25 (corresponding to the first current collector 14) that was opposite to the Li metal negative electrode 23, during the discharging, the discharge product was generated in the air electrode 27 from a side that was opposite to the Li metal negative electrode 23. Due to this, clogging of a portion of the air electrode 27 on an aluminum laminated film 28 side to which oxygen was introduced was suppressed at an initial discharging stage, and thus the entirety of the air electrode 27 was used as a reaction field. As a result, a high discharge capacity was realized. In addition, conversely, when the charging was performed using the Ni mesh 26 (corresponding to the second current collector 15) on the aluminum laminated film 28 side, during the charging, the discharge product was decomposed from a portion of the air electrode 27 on a side to which oxygen was introduced and oxygen was generated, and thus the oxygen was stably emitted to the outside of the battery.

As described above, according to the first embodiment, the air battery includes the first current collector 14 that is provided on a surface of the air electrode 12 on a negative electrode 11 side to be electrically connected to the air electrode 12, and the second current collector 15 that is provided on a surface of the air electrode 12 on a side that is opposite to the negative electrode 11 to be electrically connected to the air electrode 12. Accordingly, during discharging, when a voltage that is positive with respect to the negative electrode 11, is applied to the first current collector 14, the discharge product may be generated from a portion of the air electrode 12 on a negative electrode 11 side. Due to this, it is possible to effectively prevent a surface of the air electrode 12 from being covered with the discharge product, and prevent a void that is a passage of oxygen in the air electrode 12, from being clogged by the discharge product. As a result, diffusion of oxygen to the inside of the air electrode 12 may be maintained for a long time, and discharging may last to a final discharging stage. In addition, during charging, when a voltage that is positive with respect to the negative electrode 11, is applied to the second current collector 15, the discharge product may be decomposed from a portion of the air electrode 12 on a second current collector 15 side. Therefore, oxygen that is generated by the decomposition of the discharge product, may be smoothly emitted to the outside from a surface of the air electrode 12 on the second current collector 15 side after passing through the inside of the air electrode 12, and thus the oxygen may be effectively prevented from being retained inside the air electrode 12. As described above, during discharging, the diffusion of oxygen to the inside of the air electrode 12 may be maintained for a long time and thus a high discharge capacity may be obtained, and during charging, it is possible to prevent oxygen being retained inside the air electrode 12, and thus an air battery with high performance may be obtained.

2. Second Embodiment

Air Battery

Figure 9:
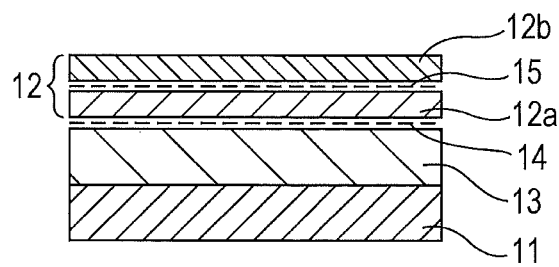
FIG. 9 is a diagram illustrating an air battery according to certain embodiments.

FIG. 9 shows an air battery according to a second embodiment. As shown in FIG. 9, in the air battery, an air electrode 12 has a two-layer structure of a lower air electrode 12a and an upper air electrode 12b. In this case, a second current collector 15 is provided between the lower air electrode 12a and the upper air electrode 12b to be electrically connected to the lower air electrode 12a and the upper air electrode 12b. In other words, in this case, the second current collector 15 is provided in the air electrode 12 including the lower air electrode 12a and the upper air electrode 12b. Configurations of the air battery other than the above-described configuration may be similar to the air battery according to the first embodiment.

Method of Manufacturing an Air Battery

The method of manufacturing the air battery is similar to the air battery according to the first embodiment except that the air electrode 12 is constructed by a two-layer structure of the lower air electrode 12a and the upper air electrode 12b, and the second current collector 15 is provided between the lower air electrode 12a and the upper air electrode 12b.

Method of Using an Air Battery

The method of using this air battery is similar to the air battery according to the first embodiment.

According to the second embodiment, the same advantages as the first embodiment may be obtained.

3. Third Embodiment

Air Battery

Figure 10:
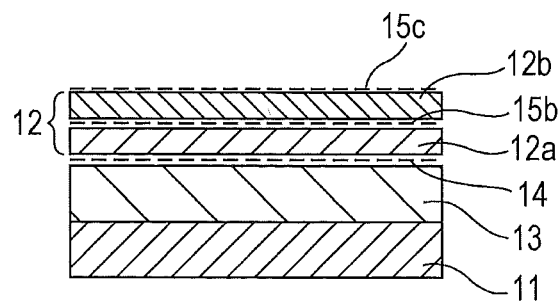
FIG. 10 is a diagram illustrating an air battery according to certain embodiments.

FIG. 10 shows an air battery according to a third embodiment. As shown in FIG. 10, in the air battery, an air electrode 12 has a two-layer structure of a lower air electrode 12a and an upper air electrode 12b. In this case, a second current collector 15b is provided between the lower air electrode 12a and the upper air electrode 12b to be electrically connected to the lower air electrode 12a and the upper air electrode 12b. In addition to this, a second current collect 15c is provided on the upper air electrode 12b to be electrically connected to the upper air electrode 12b. Configurations of this air battery other than the above-described configurations are similar to the air battery according to the first embodiment.

Method of Manufacturing an Air Battery

The method of manufacturing the air battery is similar to the air battery according to the first embodiment except that the air electrode 12 is constructed by a two-layer structure of the lower air electrode 12a and the upper air electrode 12b, the second current collector 15b is provided between the lower air electrode 12a and the upper air electrode 12b, and the second current collector 15c is provided on the upper air electrode 12b.

Method of Using an Air Battery

Figure 11A:
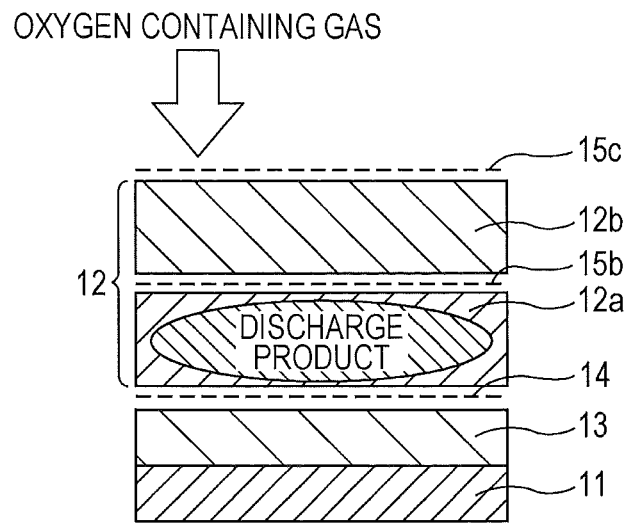
FIGS. 11A to 11C are diagrams illustrating an operation of the air battery according to certain embodiments.
Figure 11B:
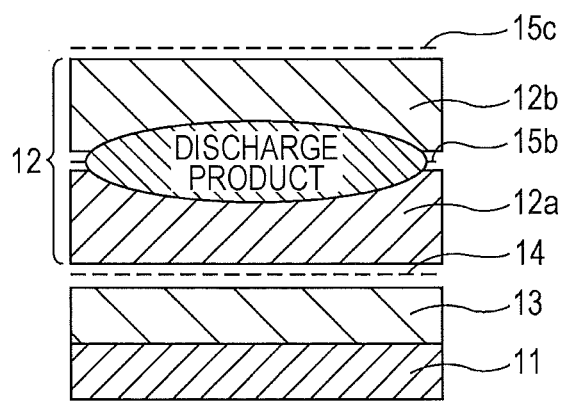
Figure 11C:
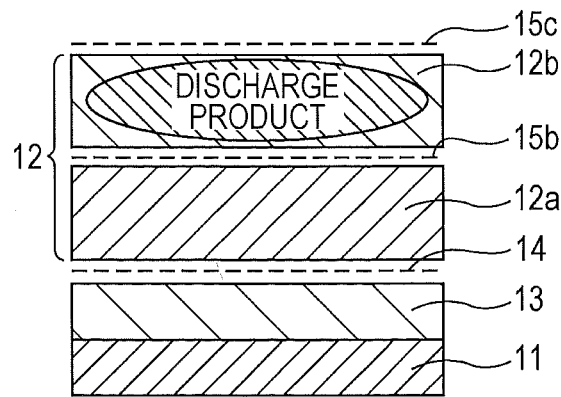

In further exemplary methods, a voltage is applied to the first current collector 14 during an initial discharging stage. At this time, as shown in FIG. 11A, a discharge product is generated in the lower air electrode 12a. In a middle discharging stage at which the discharging proceeds to some extent, a voltage is applied to the second current collector 15b. At this time, as shown in FIG. 11B, the discharge product is generated across the lower air electrode 12a and the upper air electrode 12b. Furthermore, at a final discharging stage, a voltage is applied to the second current collector 15c. At this time, as shown in FIG. 11C, the discharge product is generated in the upper air electrode 12b.

According to the third embodiment, in addition to the advantages of the first embodiment, the following advantages may be obtained. For example, in the first embodiment, the discharge product is allowed to be selectively generated in the air electrode 12 from a side that is close to the first current collector 14 through a simple operation of applying a voltage to the first current collector 14 during discharging. However, in the third embodiment, along with the proceeding of the discharging, a voltage is sequentially applied to the first current collector 14, the second current collector 15b, and the second current collector 15c, and thus a generation position of the discharge product may be controlled. In addition, the generation position of the discharge product in the air electrode 12 may be controlled. Accordingly, the total thickness of the air electrode 12 may be increased, and thus the charge capacity of the air battery may be increased. Furthermore, the following advantages may be obtained. For example, in the air battery in which the air electrode is constructed in a single layer, in a case of forming the air electrode using a porous carbon, the electrical conductivity of the carbon is not very high. Therefore, when the thickness of the air electrode increases, the distance from carbon to the current collect increases, and thus the electrical resistance therebetween increases. Conversely, according to the third embodiment, the air electrode 12 has a two-layer structure of the lower air electrode 12a and the upper air electrode 12b, the second current collector 15b is provided between the lower air electrode 12a and the upper air electrode 12b, and the second current collector 15c is formed on the upper air electrode 12b. Even when the thickness of the air electrode 12 increases, the distance from carbon to the current collector becomes short, and thus an electrical resistance therebetween may be made small. Accordingly, the output voltage of the air battery may be improved. Furthermore, for example, during instantaneous high output of the air battery, when a voltage is applied to all of the first current collector 14, the second current collector 15b, and the second current collector 15c at the same time, the instantaneous high output characteristics may be improved.

4. Fourth Embodiment

Air Battery

Figure 12:
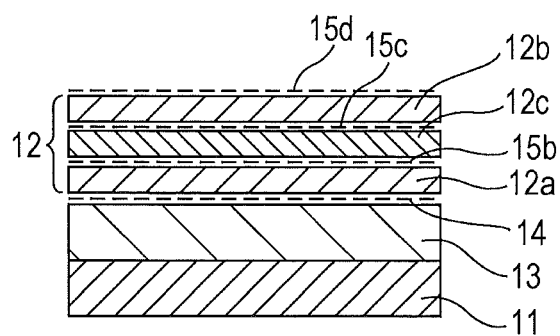
FIG. 12 is a diagram illustrating an air battery according to certain embodiments.

FIG. 12 shows an air battery according to a fourth embodiment. As shown in FIG. 12, in the air battery, an air electrode 12 has a three-layer structure of a lower air electrode 12a, an intermediate air electrode 12c, and an upper air electrode 12b. In this case, a second current collector 15b is provided between the lower air electrode 12a and the intermediate air electrode 12c to be electrically connected to the lower air electrode 12a and the intermediate air electrode 12c. In addition, a second current collector 15c is provided between the intermediate air electrode 12c and the upper air electrode 12b to be electrically connected to the intermediate air electrode 12c and the upper air electrode 12b. Furthermore, a second current collector 15d is provided on the upper air electrode 12b to be electrically connected to the upper air electrode 12b. Configurations of the air battery other than the above-described configurations are similar to the air battery according to the first embodiment.

Method of Manufacturing an Air Battery

The method of manufacturing the air battery is similar to the air battery according to the first embodiment except that the air electrode 12 is constructed in a three-layer structure of the lower air electrode 12a, the intermediate air electrode 12c, and the upper air electrode 12b, the second current collector 15b is provided between the lower air electrode 12a and the intermediate air electrode 12c, the second current collector 15c is provided between the intermediate air electrode 12c and the upper air electrode 12b, and the second current collector 15d is provided on the upper air electrode 12b.

Method of Using an Air Battery

Figure 13A:
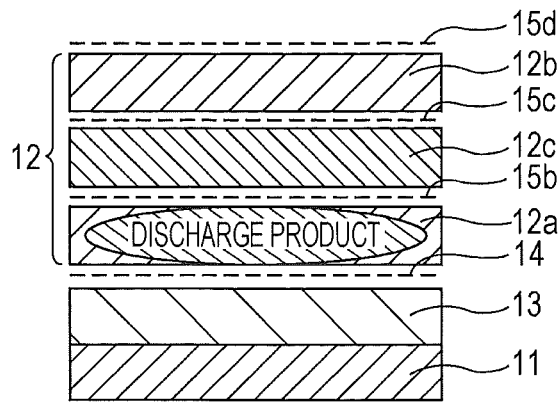
FIGS. 13A to 13D are diagrams illustrating an operation of the air battery according to certain embodiments.
Figure 13B:
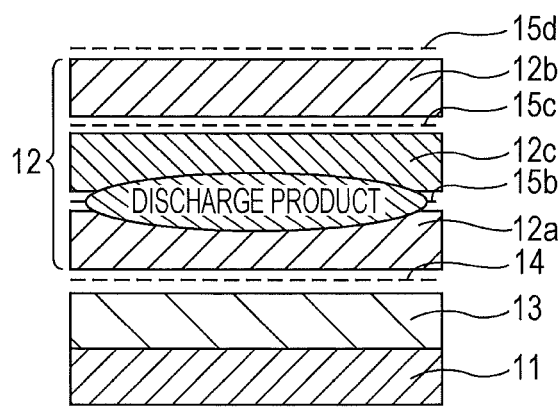
Figure 13C:
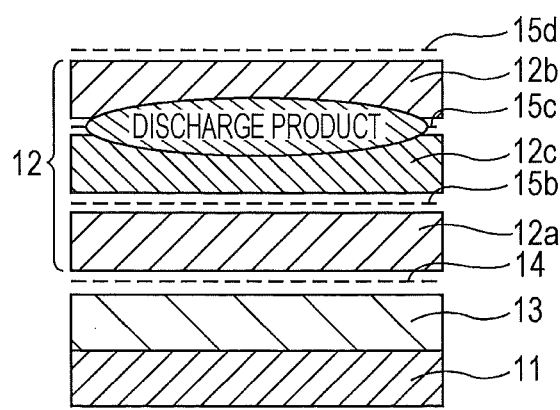
Figure 13D:
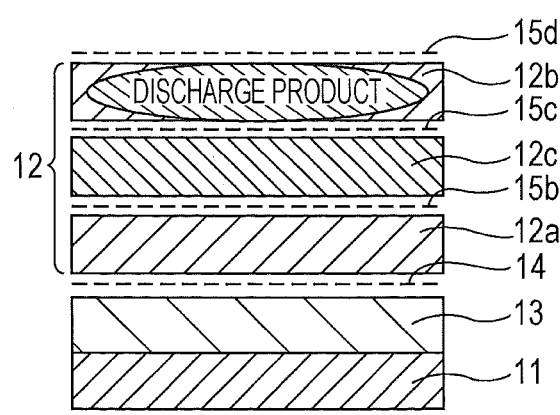

In other exemplary methods, a voltage is applied to the first current collector 14 during an initial discharging stage. At this time, as shown in FIG. 13A, a discharge product is generated in the lower air electrode 12a. In a discharging stage at which the discharging proceeds to some extent, a voltage is applied to the second current collector 15b. At this time, as shown in FIG. 13B, the discharge product is generated across the lower air electrode 12a and the intermediate air electrode 12c. In a discharging stage at which discharging further proceeds, a voltage is applied to the second current collector 15c. At this time, as shown in FIG. 13C, the discharge product is generated across the intermediate air electrode 12c and the upper air electrode 12b. At a final discharging stage, a voltage is applied to the second current collector 15d. At this time, as shown in FIG. 13D, the discharge product is generated in the upper air electrode 12b.

According to the fourth embodiment, the following advantages may be obtained. For example, along with the proceeding of discharging, a voltage is sequentially applied to the first current collector 14, the second current collector 15b, the second current collector 15c, and the second current collector 15d, and thus a generation position of the discharge product may be minutely controlled. In addition, a generation position of the discharge product in the air electrode 12 may be controlled, and thus the total thickness of the air electrode 12 may be increased. Furthermore, the following advantages may be obtained. For example, the air electrode 12 has a three-layer structure of the lower air electrode 12a, the intermediate air electrode 12c, and the upper air electrode 12b, the second current collector 15b is disposed between the lower air electrode 12a and the intermediate air electrode 12c, the second current collector 15c is provided between the intermediate air electrode 12c and the upper air electrode 12b, and the second current collector 15d is provided on the upper air electrode 12b. Accordingly, the distance from carbon to the current collector becomes short, and thus an electrical resistance therebetween may be made small. As a result, the output voltage of the air battery may be improved. Furthermore, for example, during instantaneous high output of the air battery, when a voltage is applied to all of the first current collector 14, the second current collector 15b, the second current collector 15c, and the second current collector 15d at the same time, the instantaneous high output characteristics may be improved.

5. Fifth Embodiment

Air Battery

Figure 14:
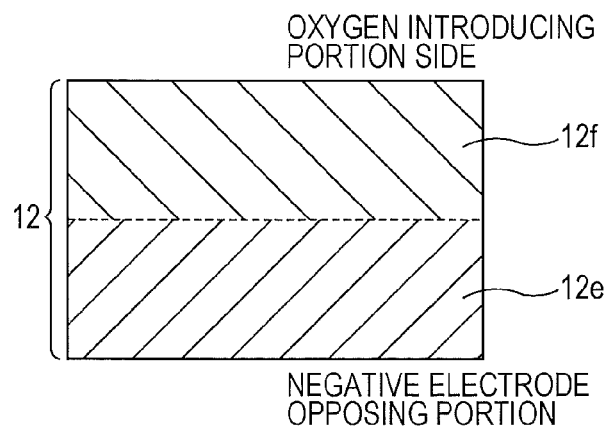
FIG. 14 is a diagram illustrating an air electrode of an air battery according to certain embodiments.

FIG. 14 shows an air electrode 12 of an air battery according to a fifth embodiment. As shown in FIG. 14, in the air battery, a first catalyst having a first discharge over-voltage is present at a lower portion 12e of the air electrode 12 on a negative electrode 11 side, and a second catalyst having a second discharge over-voltage higher than the first discharge over-voltage is present on an upper portion 12f of the air electrode 12 on a side that is opposite to the negative electrode 11.

Examples of materials of the first catalyst and the second catalyst that may be used, include inorganic ceramics such as manganese dioxide, a metal such as Au, Pt, Pd, and Ru, and an organic metal complex such as cobalt phthalocyanine, among others. For example, materials of the first catalyst and the second catalyst may be types of materials in which discharge over-voltages are different from each other may be selected. These materials may be selected in such a manner that the second discharge over-voltage becomes higher than the first discharge over-voltage by 0.01 V or more, or more preferably 0.1 V or more. As an example, when Ru and Au, in which discharge over-voltages under similar discharge conditions are different from each other by approximately 0.1 V, are used as the first catalyst and the second catalyst, respectively, target characteristics may be realized.

Configurations of the air battery other than the above-described configurations are similar to the air battery according to the first embodiment.

Method of Manufacturing an Air Battery

The method of manufacturing the air battery is similar to the air battery according to the first embodiment except for the method of manufacturing the air electrode 12. The air electrode 12 is manufactured as described below. For example, a first electrode material containing a first catalyst and a second electrode material containing a second catalyst are mixed into a predetermined organic solvent in a predetermined ratio, respectively, and the organic solvent is sufficiently evaporated from the first electrode material and the second electrode material, respectively. After the first electrode material is press-molded on the first current collector 14 constructed by, for example, a metallic mesh, the second electrode material is placed on the first electrode material, and the press-molding is again performed. In this manner, the air electrode 12, in which the first catalyst having a first discharge over-voltage is present in the lower portion 12e and the second catalyst having a second discharge over-voltage higher than the first discharge over-voltage is present in the upper portion 12f, is manufactured.

The air electrode 12 may also be manufactured by the following method. For example, the first electrode material in a state of containing the organic solvent is first applied on the first current collector 14 constructed by, for example, a metallic mesh, and the applied first electrode material is dried to evaporate the organic solvent. The second electrode material in a state of containing the organic solvent is applied on the first electrode material, and the second electrode material is dried to evaporate the organic solvent. In this manner, the air electrode 12, in which the first catalyst having a first discharge over-voltage is present in the lower portion 12e and the second catalyst having a second discharge over-voltage higher than the first discharge over-voltage is present in the upper portion 12f, is manufactured.

Method of Using an Air Battery

The method of using the air battery is similar to the air battery according to the first embodiment.

According to the fifth embodiment, in addition to the advantages of the first embodiment, the following advantages may be obtained. For example, the first catalyst having the first discharge over-voltage is present in the lower portion 12e of the air electrode 12 on the negative electrode 11 side, and the second catalyst having the second discharge over-voltage higher than the first discharge over-voltage is present in the upper portion 12f of the air electrode 12 on a side that is opposite to the negative electrode 11. Accordingly, during discharging, in addition to the effect of allowing the discharge product to be generated in the air electrode 12 from the lower portion 12e on the negative electrode 11 side by applying a voltage to the first current collector 14, it is possible to obtain an effect of allowing the discharge product to be generated in the air electrode 12 from the lower portion 12e on the negative electrode 11 side by distributing the first catalyst and the second catalyst in the air electrode 12 as described above. The discharge product may be allowed to be generated in the air electrode 12 from the lower portion 12e on the negative electrode 11 side in a relatively reliable manner, and thus the discharge capacity of the air battery may be further increased.

6. Sixth Embodiment

Air Battery

Figure 15A:
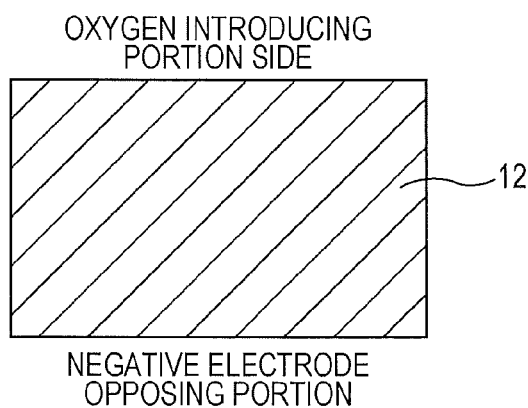
FIGS. 15A and 15B are diagrams illustrating an air electrode of an air battery and a catalyst concentration distribution in the air electrode, according to certain embodiments.
Figure 15B:
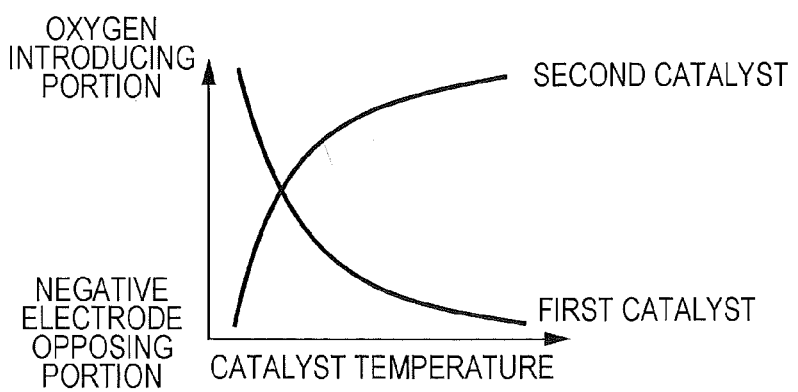

FIG. 15A shows a cross-sectional diagram illustrating an air electrode 12 of an air battery according to a sixth embodiment, and FIG. 15B shows a schematic diagram illustrating a catalyst concentration distribution in the air electrode 12. As shown in FIGS. 15A and 15B, in the air battery, the air electrode 12 contains a first catalyst having a first discharge over-voltage and a second catalyst having a second discharge over-voltage higher than the first discharge over-voltage in concentration distributions different from each other in a direction from a negative electrode 11 to the air electrode 12. For example, in this case, the concentration of the first catalyst continuously decreases in a direction from the negative electrode 11 to the air electrode 12, and the concentration of the second catalyst continuously increases in a direction from the negative electrode 11 to the air electrode 12. As a result, in a lower portion of the air electrode 12 on a negative electrode 11 side, the first catalyst is present with a higher concentration compared to the second catalyst, and in an upper portion of the air electrode 12 on a side that is opposite to the negative electrode 11, the second catalyst is present with a higher concentration compared to the first catalyst.

Configurations of this air battery other than the above-described configurations are similar to the air battery according to the first embodiment.

Method of Manufacturing an Air Battery

The method of manufacturing this air battery is similar to the air battery according to the first embodiment except for a method of manufacturing the air electrode 12. The air electrode 12 is manufactured as described below. For example, a first electrode material in a state of containing an organic solvent is first applied on a first current collector 14 constructed by, for example, a metallic mesh, and the applied first electrode material is dried to evaporate the organic solvent. Before the first electrode material is dried, a second electrode material in a state of containing an organic solvent is applied on the first electrode material, and the second electrode material is dried to evaporate the organic solvent. Then, the first electrode material and the second electrode material, which are formed as described above, are press-molded. As a result, the air electrode 12, in which in the lower portion of the air electrode 12 on the negative electrode 11 side, the first catalyst is present with a higher concentration compared to the second catalyst, and in the upper portion of the air electrode 12 on a side that is opposite to the negative electrode 11, the second catalyst is present with a higher concentration compared to the first catalyst, is manufactured.

Method of Using an Air Battery

The method of using this air battery is similar to the air battery according to the first embodiment.

According to the sixth embodiment, similar advantages as the fifth embodiment may be obtained.

7. Seventh Embodiment

Air Battery

Figure 16:
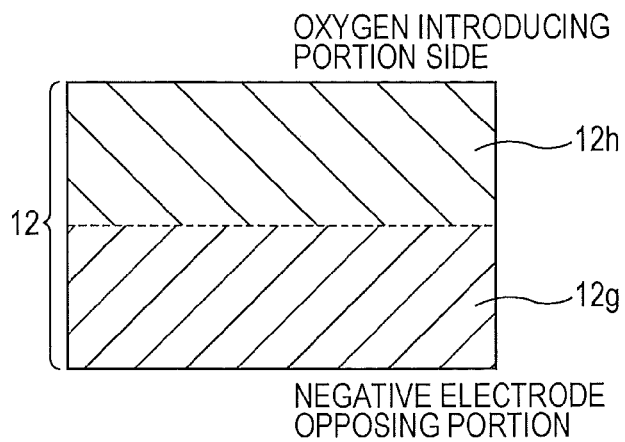
FIG. 16 is a diagram illustrating an air electrode of an air battery according to certain embodiments.

FIG. 16 shows an air electrode 12 of an air battery according to a sixth embodiment. As shown in FIG. 16, in the air battery, a catalyst is present in a lower portion 12g of an air electrode 12 on a negative electrode 11 side, and the catalyst is not present in an upper portion 12h of the air electrode 12 on a side that is opposite to the negative electrode 11. In this case, the discharge over-voltage of the catalyst that is present in the lower portion 12g of the air electrode 12 is lower than the discharge over-voltage of an electrode material that constructs the upper portion 12h of the air electrode 12, for example, a conductive material such as carbon.

Configurations of the air battery other than the above-described configurations are similar to the air battery according to the first embodiment.

Method of Manufacturing an Air Battery

The method of manufacturing this air battery is similar to the air battery according to the first embodiment except for a method of manufacturing the air electrode 12. The air electrode 12 is manufactured as described below. For example, a first electrode material containing a catalyst and a second electrode material not containing the catalyst are mixed into a predetermined organic solvent in a predetermined ratio, respectively, and the organic solvent is sufficiently evaporated from the first electrode material and the second electrode material, respectively. After the first electrode material is press-molded on a first current collector 14 constructed by, for example, a metallic mesh, the second electrode material is placed on the first electrode material, and the press-molding is again performed. In this manner, the air electrode 12, in which the catalyst is present in the lower portion 12g and the catalyst is not present in the upper portion 12h, is manufactured.

Method of Using an Air Battery

The method of using this air battery is similar to the air battery according to the first embodiment.

According to the seventh embodiment, similar advantages as the fifth embodiment may be obtained.

8. Eighth Embodiment

Air Battery

Figure 17A:
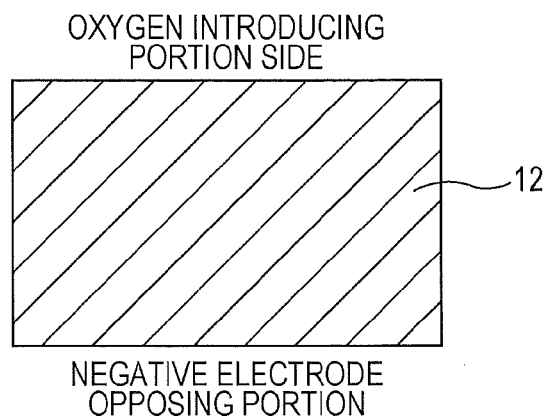
FIGS. 17A and 17B are diagrams illustrating an air electrode of an air battery and a catalyst concentration distribution in the air electrode, according to certain embodiments.
Figure 17B:
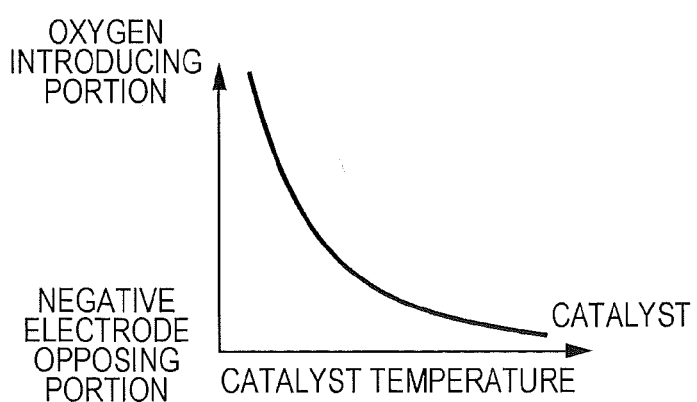

FIG. 17A shows a cross-sectional diagram illustrating an air electrode 12 of an air battery according to an eighth embodiment, and FIG. 17B shows a schematic diagram illustrating a catalyst concentration distribution in the air electrode 12. As shown in FIGS. 17A and 17B, in the air battery, the air electrode 12 contain one kind of catalyst, and a concentration of this catalyst continuously decreases in a direction from a negative electrode 11 to the air electrode 12.

Configurations of the air battery other than the above-described configurations are similar to the air battery according to the first embodiment.

Method of Manufacturing an Air Battery

The method of manufacturing this air battery is similar to the air battery according to the first embodiment except for a method of manufacturing the air electrode 12. The air electrode 12 is manufactured as described below. For example, a catalyst-containing electrode material in a state of containing an organic solvent is first applied on a first current collector 14 constructed by, for example, a metallic mesh, and the applied electrode material is dried to gradually evaporate the organic solvent. Then, the electrode material, which is formed in this manner, is press-molded. Accordingly, the air electrode 12, in which a concentration of the catalyst continuously decreases in a direction from the negative electrode 11 to the air electrode 12, is manufactured.

Method of Using an Air Battery

The method of using this air battery is similar to the air battery according to the first embodiment.

According to the eighth embodiment, similar advantages as the fifth embodiment may be obtained.

Figure 18:
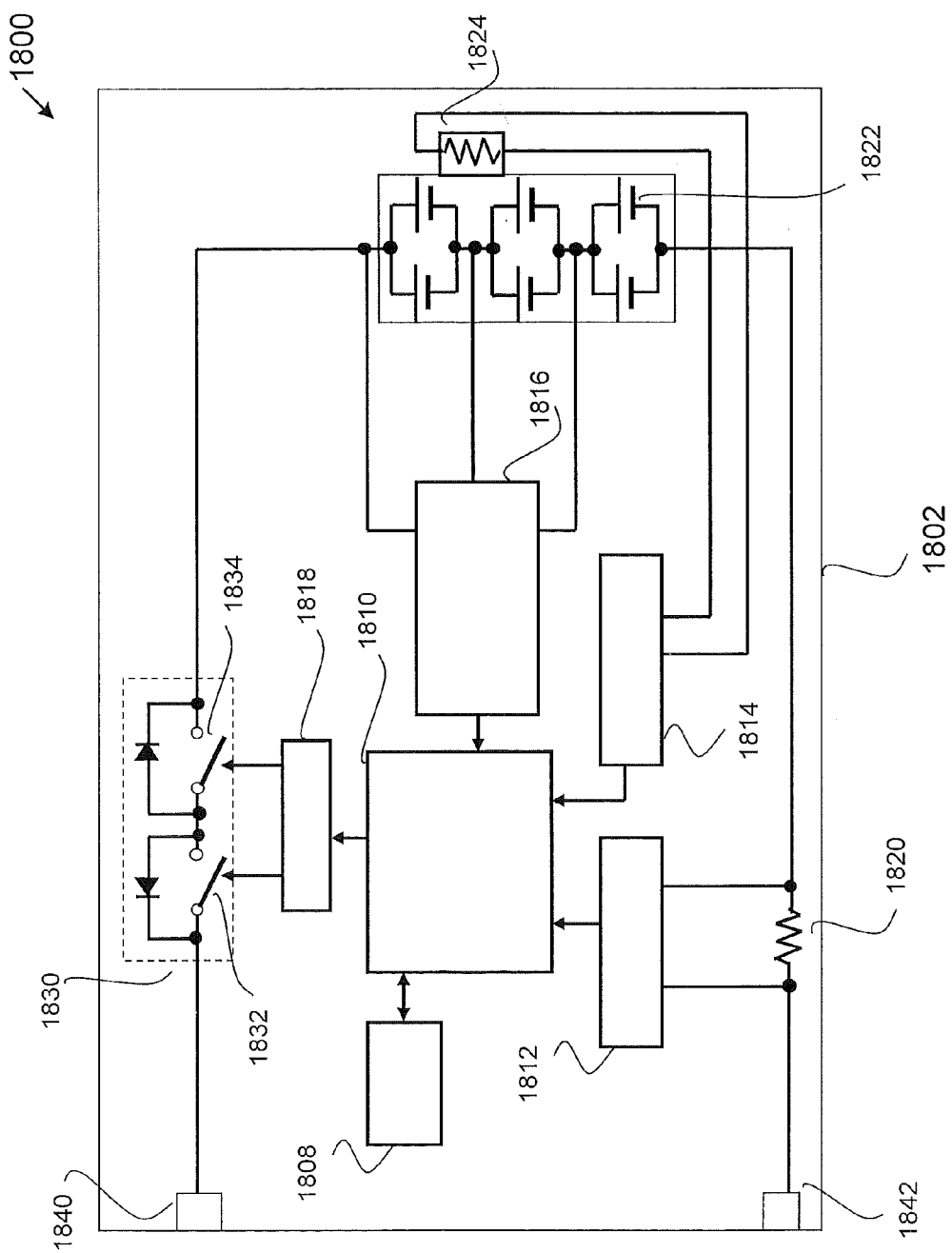
FIG. 18 is a diagram illustrating a battery pack according to certain embodiments.

FIG. 18 is a diagram illustrating a battery pack according to certain embodiments. In FIG. 18, the battery pack 1800 includes a memory 1808 connected to a controller 1810. The controller 1810 is also connected to a current measurement part 1812, a temperature detector part 1814, a voltage detector part 1816, and a switch control part 1818. The current measurement part 1812 is connected to a resistor 1820, which is connected to cells 1822. The cells 1822 are connected to a resistor 1824, which is connected to the temperature detector part 1814. The cells 1822 are also connected to a switch 1830 that includes a charge control switch 1832 and a discharge control switch 1834.

The above referenced components may be encompassed by external packaging 1802. The battery pack 1800 also includes a positive electrode terminal 1840 and a negative electrode terminal 1842, connected as shown. In embodiments, the cells 1822 are an air battery in accordance with the present disclosure.

Figure 19:
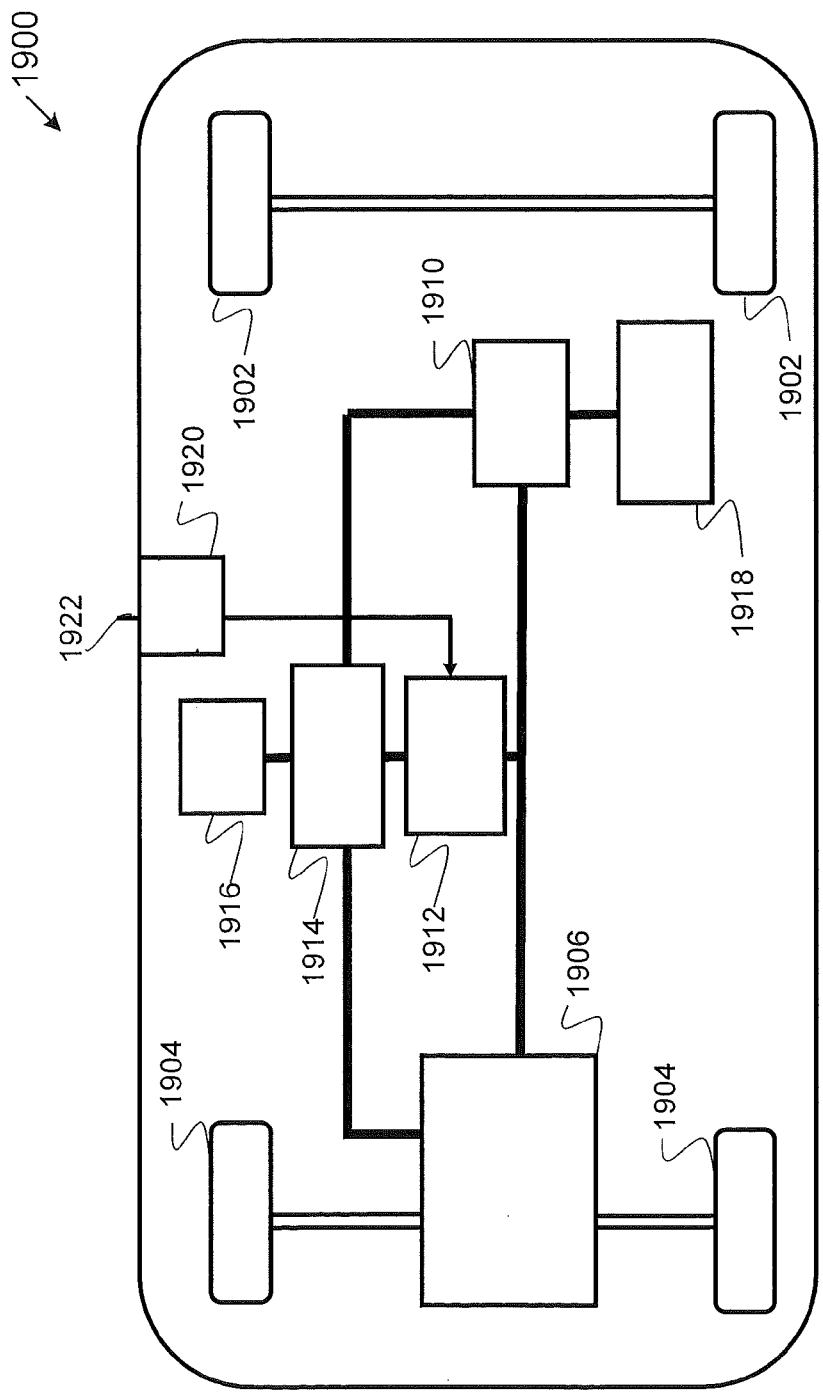
FIG. 19 is a diagram illustrating a vehicle according to certain embodiments.

FIG. 19 is a diagram illustrating a vehicle according to certain embodiments. In particular, FIG. 19 illustrates a hybrid vehicle 1900 that includes wheels 1902 and drive wheels 1904. An electric power drive force conversion device 1906 is connected to the drive wheels 1904, and to an electricity generator 1910, a battery 1912, and a vehicle control apparatus 1914, as shown. The vehicle control apparatus 1914 is connected to sensors 1916.

The electricity generator 1910 is connected to an engine 1918, and the battery 1912 may be connected to a charge port 1920, which may interface with an external power supply 1922. Various other components, including structural and mechanical components, are not shown in FIG. 19. In embodiments, the battery 1912 is an air battery in accordance with the present disclosure.

Figure 20:
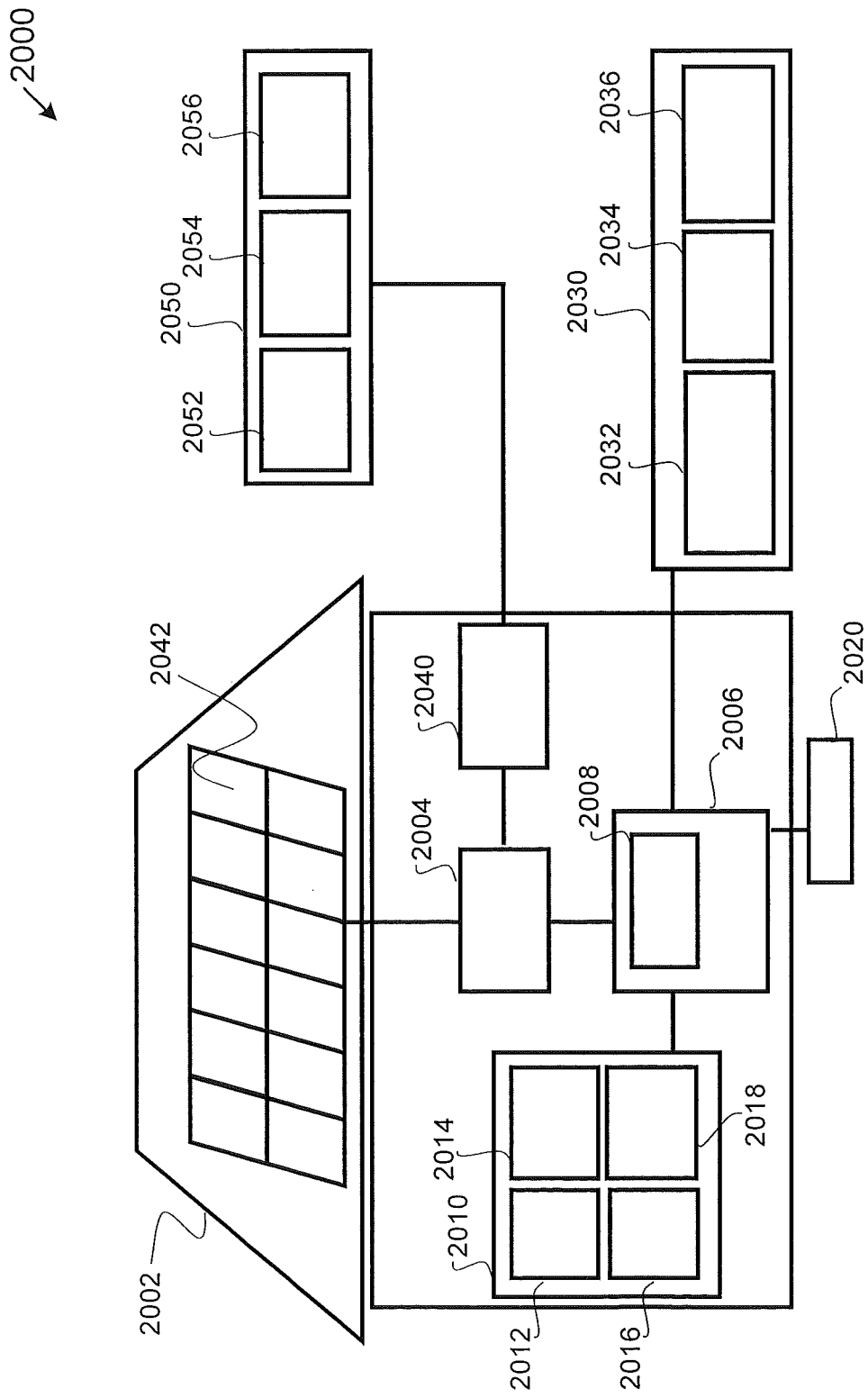
FIG. 20 is a diagram illustrating a power system according to certain embodiments.

FIG. 20 is a diagram illustrating a power system according to certain embodiments. In FIG. 20, the power system 2000 includes a house 2002 that has a power hub 2004. The power hub is connected to an electric storage device 2006 interfacing with a control apparatus 2008, which may include sensors, or be connected to sensors. The electric storage device 2006 may be connected to power consumption electronics 2010, including a bath 2012, a refrigerator 2014, a television 2016, and an air conditioner 2018. In addition, the electric storage device 2006 may be connected to a server 2020, which may reside outside of the house 2002. The electric storage device 2006 may also be connected to additional power consumption electronics 2030, including an electrically driven vehicle 2032, a hybrid vehicle 2034, and a motorbike 2036. The power hub 2004 may be connected to power-generating equipment 2042 and a smart meter 2040, which is connected to a centralized power system 2050 that includes, for example, heat power 2052, nuclear power 2054, and hydraulic power 2056. In embodiments, the connections between the components in FIG. 20 may be a power network and/or an information network, and the electric storage device 2006 may be an air battery in accordance with the present disclosure.

Hereinbefore, the certain embodiments and examples have been described in detail, but the present disclosure is not limited to the above-described embodiment and examples, and various modifications may be made.

For example, the numerical values, the structures, the configurations, the shapes, the materials, and other aspects in the above-described certain embodiments and examples are illustrative only, and different numerical values, structures, configurations, shapes, materials, and other aspects may be used. For example, in the second, third, and fourth embodiments, the air electrode 12 is divided into two pieces or three pieces, but may be divided into four pieces or more. In addition, the catalyst distribution in the air electrode 12 may be a catalyst distribution different from that of the fifth to eighth certain embodiments to the extent that during discharging, the discharge product is generated from a portion of the air electrode 12 on the negative electrode 11 side. Furthermore, two or more of the above-described first to eighth certain embodiments may be combined.

In addition, the present disclosure may have the following configuration.

(1) A battery device, comprising:
a negative electrode;
an air electrode;
an electrolyte layer that is positioned between the negative electrode and the air electrode;
a first current collector on a first surface of the air electrode closest to the negative electrode; and
a second current collector on a second surface of the air electrode positioned opposite to the negative electrode;
wherein the first current collector and the second current collector are each electrically connected to the air electrode.

(2) The device of (1), wherein the negative electrode comprises a metal.

(3) The device of (2), wherein the metal comprises at least one metal selected from the group consisting of Li, K, Na, Mg, Ca, Zn, and Al.

(4) The device of (1), wherein the second current collector is oxygen-permeable.

(5) The device of (4), wherein the oxygen permeates through a hole in the second current collector.

(6) The device of (1), wherein at least one of the first current collector and the second current collector comprises a metallic mesh material.

(7) An air battery adapted for use with an electronic device, comprising:
an air battery comprising a negative electrode, an air electrode, an electrolyte layer that is positioned between the negative electrode and the air electrode, a first current collector on a first surface of the air electrode and positioned closest to the negative electrode, and a second current collector positioned on a second surface of the air electrode positioned opposite to the negative electrode and inside of the air electrode, wherein the first current collector and the second current collector are each electrically connected to the air electrode; and
wherein electric power is supplied to the electronic device from the air battery.

(8) The air battery of (7), wherein the electronic device is a portable device.

(9) The air battery of (7), wherein the electronic device is a stationary device.

(10) The air battery of (7), wherein the electronic device is at least one of a cellular phone, a mobile device, a robot, a personal computer, an in-vehicle device, and an appliance.

(11) The air battery of (7), wherein the electronic device is an electrically driven vehicle comprising a converter that is supplied with power from the air battery.

(12) The air battery of (11), wherein the converter converts the power from the air battery to a driving force of the vehicle.

(13) The air battery of (11), further comprising a control device that processes information related to vehicle control on the basis of information related to the air battery.

(14) The air battery of (11), further comprising a control device that processes information related to vehicle control on the basis of a remaining power of the air battery.

(15) The air battery of (11), wherein the vehicle is at least one of an electric vehicle, a hybrid vehicle, a bicycle, and a railway vehicle.

(16) The air battery of (7), further comprising an electric power system that supplies power to the air battery from an electric power source.

(17) The air battery of (7), further comprising an electric power system, wherein the air battery supplies power to the electronic power system.

(18) The air battery of (16), wherein the electric power system comprises at least one of a smart grid, a household energy management system, and a vehicle.

(19) The air battery of (17), wherein the electric power system comprises at least one of a smart grid, a household energy management system, and a vehicle.

(20) A method of manufacturing a battery device, comprising the steps of:
forming a negative electrode;
forming an air electrode;
forming an electrolyte layer that is positioned between the negative electrode and the air electrode;
forming a first current collector on a first surface of the air electrode closest to the negative electrode;
forming a second current collector on a second surface of the air electrode positioned opposite to the negative electrode, wherein the first current collector and the second current collector are each electrically connected to the air electrode; and
assembling each of the negative electrode, the air electrode, the electrolyte layer, the first current collector, and the second current collector to form the battery device.

(21) An air battery comprising:
a negative electrode containing at least a metal;
an air electrode;
an electrolyte layer that is provided between the negative electrode and the air electrode;
a first current collector that is provided on a surface of the air electrode on a negative electrode side to be electrically connected to the air electrode; and
a second current collector that is provided at least one of on a surface of the air electrode on a side that is opposite to the negative electrode and inside the air electrode to be electrically connected to the air electrode.

(22) The air battery according to (21), wherein the second current collector has an oxygen-permeable configuration.

(23) The air battery according to (22), wherein the first current collector and the second current collector are constructed by a metallic mesh.

(24) The air battery according to (23), wherein the negative electrode is constructed by a metallic electrode, or an electrode that contains at least one kind of metal as a main component.

(25) The air battery according to (24), wherein the negative electrode contains at least one kind of metal selected from a group consisting of Li, K, Na, Mg, Ca, Zn, and Al.

(26) A method of using an air battery, when using the air battery including a negative electrode containing at least a metal, an air electrode, an electrolyte layer that is provided between the negative electrode and the air electrode, a first current collector that is provided on a surface of the air electrode on a negative electrode side to be electrically connected to the air electrode, and a second current collector that is provided at least one of on a surface of the air electrode on a side that is opposite to the negative electrode and inside the air electrode to be electrically connected to the air electrode, the method including:
applying a voltage, which is positive with respect to the negative electrode, to at least the first current collector in the first current collector and the second current collector during discharging; and
applying a voltage, which is positive with respect to the negative electrode, to at least the second current collector in the first current collector and the second current collector during charging.

(27) An electronic device comprising:
an air battery,
wherein the air battery includes,
a negative electrode containing at least a metal,
an air electrode,
an electrolyte layer that is provided between the negative electrode and the air electrode,
a first current collector that is provided on a surface of the air electrode on a negative electrode side to be electrically connected to the air electrode, and
a second current collector that is provided at least one of on a surface of the air electrode on a side that is opposite to the negative electrode and inside the air electrode to be electrically connected to the air electrode.

The present disclosure, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. The features of the embodiments of the disclosure may be combined in alternate embodiments other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the description of the disclosure has included description of one or more embodiments and certain variations and modifications, other variations, combinations, and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The present disclosure contains subject matter related to that disclosed in Japanese Priority Patent Application JP 2012-083479 filed in the Japan Patent Office on Apr. 2, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A battery device, comprising:
    a negative electrode;
    an air electrode;
    an electrolyte layer that is positioned between the negative electrode and the air electrode;
    a first current collector on a first surface of the air electrode closest to the negative electrode; and
    a second current collector on a second surface of the air electrode positioned opposite to the negative electrode;
    wherein the first current collector and the second current collector are each electrically connected to the air electrode.

2. The device of claim 1, wherein the negative electrode comprises a metal.

3. The device of claim 2, wherein the metal comprises at least one metal selected from the group consisting of Li, K, Na, Mg, Ca, Zn, and Al.

4. The device of claim 1, wherein the second current collector is oxygen-permeable.

5. The device of claim 4, wherein the oxygen permeates through a hole in the second current collector.

6. The device of claim 1, wherein at least one of the first current collector and the second current collector comprises a metallic mesh material.

7. An air battery adapted for use with an electronic device, comprising:
    an air battery comprising a negative electrode, an air electrode, an electrolyte layer that is positioned between the negative electrode and the air electrode, a first current collector on a first surface of the air electrode and positioned closest to the negative electrode, and a second current collector positioned on a second surface of the air electrode positioned opposite to the negative electrode and inside of the air electrode, wherein the first current collector and the second current collector are each electrically connected to the air electrode; and
    wherein electric power is supplied to the electronic device from the air battery.

8. The air battery of claim 7, wherein the electronic device is a portable device.

9. The air battery of claim 7, wherein the electronic device is a stationary device.

10. The air battery of claim 7, wherein the electronic device is at least one of a cellular phone, a mobile device, a robot, a personal computer, an in-vehicle device, and an appliance.

11. The air battery of claim 7, wherein the electronic device is an electrically driven vehicle comprising a converter that is supplied with power from the air battery.

12. The air battery of claim 11, wherein the converter converts the power from the air battery to a driving force of the vehicle.

13. The air battery of claim 11, further comprising a control device that processes information related to vehicle control on the basis of information related to the air battery.

14. The air battery of claim 11, further comprising a control device that processes information related to vehicle control on the basis of a remaining power of the air battery.

15. The air battery of claim 11, wherein the vehicle is at least one of an electric vehicle, a hybrid vehicle, a bicycle, and a railway vehicle.

16. The air battery of claim 7, further comprising an electric power system that supplies power to the air battery from an electric power source.

17. The air battery of claim 7, further comprising an electric power system, wherein the air battery supplies power to the electronic power system.

18. The air battery of claim 16, wherein the electric power system comprises at least one of a smart grid, a household energy management system, and a vehicle.

19. The air battery of claim 17, wherein the electric power system comprises at least one of a smart grid, a household energy management system, and a vehicle.

20. A method of manufacturing a battery device, comprising the steps of:
    forming a negative electrode;
    forming an air electrode;
    forming an electrolyte layer that is positioned between the negative electrode and the air electrode;
    forming a first current collector on a first surface of the air electrode closest to the negative electrode;
    forming a second current collector on a second surface of the air electrode positioned opposite to the negative electrode,
    wherein the first current collector and the second current collector are each electrically connected to the air electrode; and
    assembling each of the negative electrode, the air electrode, the electrolyte layer, the first current collector, and the second current collector to form the battery device.

* * * * *